(12) United States Patent
Kuo et al.

(10) Patent No.: US 8,241,815 B2
(45) Date of Patent: Aug. 14, 2012

(54) SOLID OXIDE FUEL CELL (SOFC) DEVICE HAVING GRADIENT INTERCONNECT

(75) Inventors: Dong-Hau Kuo, Taipei (TW); Ren-Kae Shiue, Taipei (TW); Hung-Li Hsu, Taipei (TW); Ming-Hsiung Wei, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 347 days.

(21) Appl. No.: 12/753,825

(22) Filed: Apr. 2, 2010

(65) Prior Publication Data

US 2010/0291468 A1     Nov. 18, 2010

(30) Foreign Application Priority Data

May 15, 2009   (TW) ................................ 98116134 A

(51) Int. Cl.
*H01M 8/10* (2006.01)

(52) U.S. Cl. ......... 429/483; 429/517; 429/519; 429/469

(58) Field of Classification Search .................. 429/483, 429/488, 489, 495, 517, 519, 520, 468, 469
See application file for complete search history.

(56) References Cited

FOREIGN PATENT DOCUMENTS

WO     WO 2008040682 A  *  4/2008

* cited by examiner

*Primary Examiner* — Yogendra Gupta
*Assistant Examiner* — Alison Hindenlang

(57) ABSTRACT

A solid oxide fuel cell (SOFC) device having a gradient interconnect is provided, including a first gradient interconnect having opposing first and second surfaces, a first trench formed over the first surface of the first gradient interconnect, a second trench formed over the second surface of the first gradient interconnect, and an interconnecting tunnel formed in the first gradient interconnect for connecting the first and second trenches. A first porous conducting disc is placed in the first trench and partially protrudes over the first surface of the first gradient interconnect. A first sealing layer is placed over the first surface of the first gradient interconnect and surrounds the first trench. A membrane electrode assembly (MEA) is placed over the first surface of the first gradient interconnect and contacted with the first porous conducting disc and the first sealing layer.

20 Claims, 9 Drawing Sheets

SOLID OXIDE FUEL CELL (SOFC) DEVICE HAVING GRADIENT INTERCONNECT

CROSS REFERENCE TO RELATED APPLICATIONS

This Application claims priority of Taiwan Patent Application No. 98116134, filed on May 15, 2009, the entirety of which is incorporated by reference herein.

BACKGROUND OF THE INVENTION

1. Field of the Invention

The present invention relates to fuel cell devices, and in particularly to solid oxide fuel cell (SOFC) devices having a gradient interconnect therein.

2. Description of the Related Art

Fuel cells such as proton exchange membrane fuel cells (PEMFCs) or direct methanol fuel cell (DMFC) operating at a low temperature and fuel cells such as molten carbonates fuel cells (MCFC) and solid oxide fuel cells (SOFCs) operating at a high temperature have already been developed. Advantages of SOFCs are low pollutants, high energy conversion efficiency, and no electrolyte evaporation, leakage and corrosion since the electrolyte therein is formed in a solid state. Thus, SOFCs have long operating lifespan.

The SOFC comprises an anode, a cathode, a solid oxide electrolyte, and an interconnect plate (also called bipolar plates or interconnects). The interconnect plate is a key component of the SOFC and materials thereof can be either made of ceramic materials or metal materials. The interconnect plate junctions a cathode and an anode of two adjacent single cell units and functions as a physical barrier for protecting materials in the cathode electrode from the reduction environment of the cathode end of the SOFC. Additionally, the interconnect plate protects the anode electrode materials from the oxidized environment of the anode end of the SOFC.

Metal interconnect plates made of materials such as iron-based materials are typically employed in SOFCs. Ceramic oxides such as $LaCrO_3$ is a material used in interconnect plates, which allows high operating temperature. However, $LaCrO_3$ is difficult to process due to poor ductility when compared to iron-based materials and is expensive.

Therefore, iron-based materials are mainly employed in SOFCs. However, iron-based materials, used with solid oxide electrolyte of yttria-stabilized zirconia (YSZ) have a junction issue at a ceramic/iron interface therebetween. Mixing of hydrogen and oxygen may occur at an edge of the solid oxide electrolyte, thereby negatively affecting sealing of the SOFC. In addition, the iron-based materials will be oxidized at higher temperature in air.

Moreover, since the high operation temperature and thermal cycling performed during the operations of the SOFC, high thermal stresses are thus generated. Junctions between components such as the solid oxide electrolyte, the electrode and the interconnect plate of the SOFCs which are composed of various materials may be thereby affected by the thermal stresses formed during high temperature operating and thermal cycling operation thereof. Therefore, cracking of components in the SOFC may thus happen and thereby damage the mechanical structure and integrity of the SOFC. Leakage of the reaction gas of the SOFC is thus happened.

Therefore, there's a need to improve the structure of the SOFC to solve the sealing issue, the oxidation issue at high operating temperatures and mechanical structure integration issues caused by using the conventional solid oxide electrolyte and interconnect plate.

BRIEF SUMMARY OF THE INVENTION

Accordingly, solid oxide fuel cell (SOFC) devices having gradient interconnects and methods for fabricating the same are provided.

An exemplary SOFC device having a gradient interconnect comprises a first gradient interconnect having opposing first and second surfaces, a first trench formed over the first surface of the first gradient interconnect, a second trench formed over the second surface of the first gradient interconnect, and an interconnecting tunnel formed in the first gradient interconnect for connecting the first and second trenches. A first porous conducting disc is positioned in the first trench and partially protrudes over the first surface of the first gradient interconnect. A first sealing layer is placed over the first surface of the first gradient interconnect and surrounds the first trench. A membrane electrode assembly (MEA) is positioned over the first surface of the first gradient interconnect, wherein the MEA comprises an electrolyte layer having opposing first and second surfaces, a first electrode placed over the first surface, and a second electrode placed over the second surface, and the first surface of the electrolyte layer contacts with the first sealing layer and the first electrode contacts with the first porous conducting disc.

In another embodiment, the SOFC device further comprises a second gradient interconnect positioned over the second surface of the electrolyte layer, having opposing third and fourth surfaces, a third trench formed over the third surface of the second gradient interconnect, a fourth trench formed over the fourth surface of the second gradient interconnect, and an second interconnecting tunnel formed in the second gradient interconnect for connecting the third and fourth trenches. A second porous conducting disc is placed in the third trench and partially protrudes over the third surface of the second gradient interconnect. A second sealing layer is disposed over the third surface of the second gradient interconnect, surrounding the third trench, wherein the second surface of the electrolyte layer contacts with the second sealing layer and the second electrode contacts with the second porous conductive interconnecting disc.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Various exemplary embodiments of solid oxide fuel cell (SOFC) devices of the invention and fabrication methods thereof are discussed as follows by incorporating illustrations of FIGS. 1-10.

Figure 1:
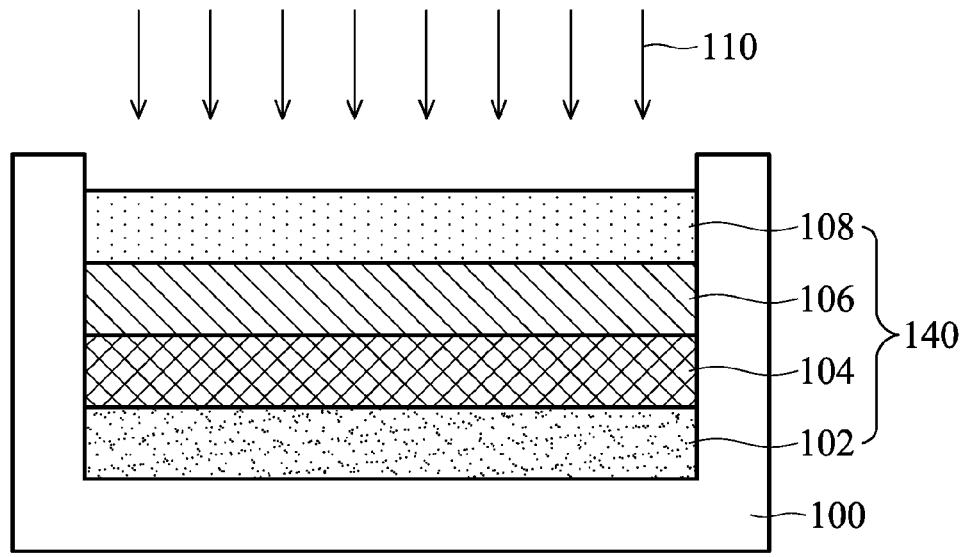
FIGS. 1 and 2 are cross sections showing a method for fabricating a gradient interconnect according to an embodiment of the invention.
Figure 2:
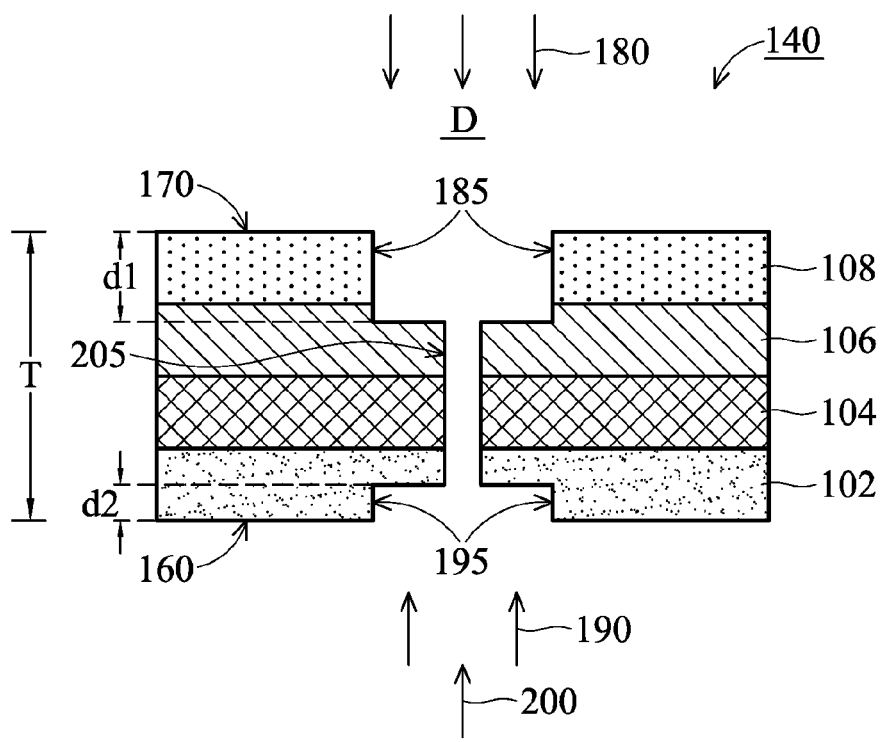

As shown in FIGS. 1-2, fabrication of an exemplary gradient interconnect is illustrated. The exemplary gradient interconnect can be applied in the solid oxide fuel cell (SOFC) devices of the invention.

As shown in FIG. 1, a mold 100 made of material such as graphite is provided. Next, a plurality of gradient sub-layers 102, 104, 106, and 108 is sequentially provided and stacked in the mold 100 from bottom to top. Amount of the gradient sub-layers provided in the mold 100 are not limited by the four gradient sub-layers illustrated in FIG. 1 and can be reduced or increased according to particle fabrication demands.

In one embodiment, materials for forming the sub-layers 102, 104, 106, and 108 can be sequentially stacked in the mold 100 from bottom to top by wet processing methods such as tape-casting, plasma spraying, and screen-printing. Materials for forming the gradient sub-layers 102, 104, 106 and 108 comprise ceramic materials and nickel-based super alloys of various contents.

A content of the ceramic materials in the gradient sub-layers 104, 106, and 108 is increased from the gradient sub-layer 104 to the gradient sub-layer 108, and a content of the nickel-based super alloys in the gradient sub-layers 104, 106, and 108 is increased from the gradient sub-layer 108 to the gradient sub-layer 104. During formation of the gradient sub-layers 102, 104, 106, and 108, contents of the materials therein are properly changed and additional processes such as drying and sintering are performed to remove organic materials provided in each of the gradient sub-layers after the wet processing methods discussed above.

Next, a compression process 110 is performed under a temperature of about 1000° C. ~1300° C. and a nitrogen atmosphere to thermally compress the gradient sub-layers 102, 104, 106 and 108 in the mold 100 for about 30 minutes, such that the gradient sub-layers 102, 104, 106, and 108 are joined and form a gradient interconnect 140. The gradient interconnect 140 is formed with an overall thickness T of about 1~4 mm (shown in FIG. 2). The gradient sub-layer 108 in the gradient interconnect 140 is formed with a ceramic content not less than 50 vol % and a nickel-based super alloys content not more than 50 vol %. The gradient sub-layer 102 comprises 50~100% nickel-based super-alloys, 30~40 vol % iron-based steels, and 0~20 vol % ceramic.

The gradient sub-layer 108 is formed with a ceramic content not less than 50 vol %, the gradient sub-layer 108 is not electrically conductive, and the other gradient sub-layers 106, 104 and 102 are formed with a ceramic content of not greater than 50 vol % or even a ceramic content of 0 vol %. The gradient sub-layers 106, 104, and 102 are conductive sub-layers.

In an embodiment, suitable nickel-based super alloys for fabrication of the gradient sub-layers 102, 104, 106 and 108 can be, for example, Inco625, Inco600, or Inco 601, and suitable ceramic materials for fabrication of the gradient sub-layers 102, 104, and 106 can be, for example, conductive ceramics of SiC, TiN, and BN, nano $Al_2O_3$, yttrium stabilized zirconia (e.g. $8Y-ZrO_2$ and $3Y-ZrO_2$), $Bi_2O_3$, MnO, barium aluminosilicate (e.g. $BaAl_2Si_2O_8$), silicate glass or titanium dioxide ($TiO_2$). Iron-based steels can be added in nickel-based super alloys to adjust the thermal stress behaviors. Composition of the materials are described as follows:

Inco625 is composed of Ni with a 61 wt % content, Cr with a 21.5 wt % content, Fe with a 2.5 wt % content, Mn with a 0.2 wt % content, Si with a 0.2 wt % content, Mo with a 9 wt % content, and Nb with a 3.6 wt % content.

Inco600 is composed of Ni with a 75 wt % content, Cr with a 15.5 wt % content, Fe with a 8 wt % content, Mn with a 0.5 wt % content, and Si with a 0.2 wt % content.

Inco601 is composed of Ni with a 60.5 wt % content, Cr with a 23 wt % content, Fe with a 14.1 wt % content, Mn with a 0.5 wt % content, Si with a 0.2 wt % content, and Al with a 1.4 wt % content.

Yttrium stabilized zirconia may comprise 8 wt % $Y_2O_3$—$ZrO_2$ or 3 wt % $Y_2O_3$—$ZrO_2$.

The barium aluminosilicate may comprise $BaAl_2Si_2O_8$.

The silicate glass is composed of $BaAl_2Si_2O_8$ doped with 0~20 wt % $Li_2O$, $Na_2O$, $K_2O$, or $Ba_2O_3$.

The iron-based steels may comprise pure iron, 304SS, 410SS, 430SS.

In FIG. 2, the gradient interconnect 140 is separated from the mold 100 and a mechanical process is then performed on the gradient interconnect 140. For example, a mechanical process 180 such as turning, milling or polishing is performed on a surface 170 of the gradient sub-layer 170, such that a trench 185 is formed in the gradient sub-layers 108 and 106. The trench 185 is formed with a depth d1 of about 0.2~0.8 mm. Next, another mechanical process 190 such as turning, milling or polishing is performed on a surface 160 of the gradient sub-layer 102 to form a trench 195 in the gradient sub-layer 102. The trench 195 is formed with a depth d2 of about 0.2~0.8 mm. Next, yet another mechanical process 200 such as drilling is performed on the gradient sub-layer 102 exposed by the trench 195 to form a interconnecting tunnel 208 penetrating the gradient sub-layers 102, 104, 106 and 108. The interconnecting tunnel 208 connects the trench 195 in the gradient sub-layer 108 and the trench 185 in the gradient sub-layer 102.

In this embodiment, the trench 185 functions as a conductive trench for placing a porous conducting disc for electrically connecting the gradient interconnect 140 with an anode electrode or a cathode electrode, and the trench 195 functions as a gas tank for containing reaction gases such as oxygen or hydrogen. The interconnecting tunnel 205 functions as a gas tunnel provided between the trenches 185 and 195, such that the reaction gases can be transported from the trench 195 to the porous conductive disc placed in the trench 185, thereby allowing the transportation of reaction gases close to MEA for electrochemical reactions.

The interconnecting tunnel 205 in the embodiment is illustrated as a single tunnel with a diameter D not greater 2 mm. The interconnecting tunnel 205 is not limited to that illustrated in FIG. 2 and a plurality of spaced interconnecting tunnels 205 may be provided in the gradient sub-layers 102, 104, 106, and 108 to increase transportation of the reaction gases from the trench 195 to the porous conducting disc formed in the trench 185 for reaction therewith.

As shown in FIG. 2, the trench 185 is now formed in two gradient sub-layers 108 and 106, and the trench 195 is formed in one gradient sub-layer 102. Formations of the trenches 185 and 195, however, are not limited by that illustrated in FIG. 2 and a bottom surface of the trenches 185 and 195 can be formed in half a gradient sub-layer, a gradient sub-layer, one and a half gradient sub-layers, or two gradient sub-layers to thereby reveal a surface of the gradient sub-layer with electrical conductivity.

Figure 3:
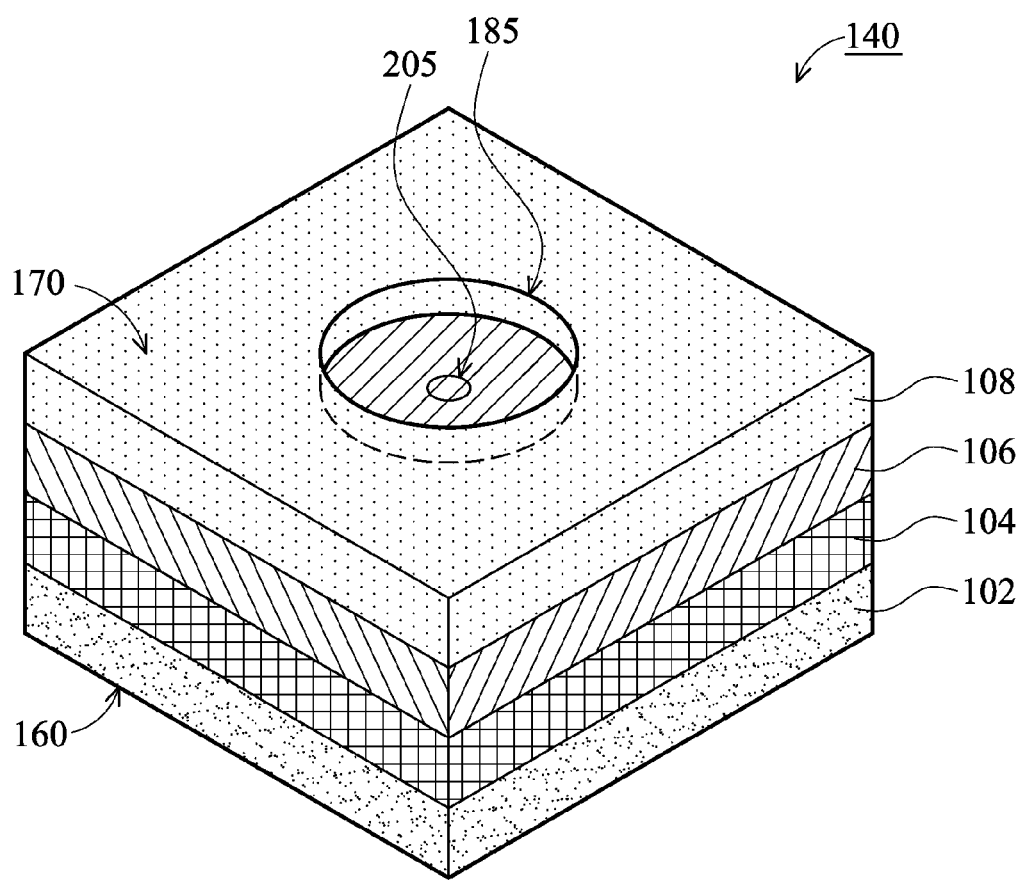
FIGS. 3 and 4 are stereo diagrams showing a gradient interconnect according to various embodiments of the invention.

FIG. 3 is a stereo diagram showing the gradient interconnect 140 illustrated in FIG. 2. Herein, the gradient interconnect 140 is illustrated as a rectangular solid, but is not limited thereto. The gradient interconnect 140 can be also formed in other configurations such as a cylinder. As shown in FIG. 3, the trench 185 is a circular trench placed in the gradient sub-layers 108 and 106, and is exposed by the surface of the gradient sub-layer 106, and the trench 185 also reveals the interconnecting tunnel 205 formed through the gradient sub-layers 102, 104, 106 and 108. The trench 195 located in the gradient sub-layer 102 is not illustrated in FIG. 3 since the trench 195 is embedded within the gradient sub-layer 102.

Figure 4:
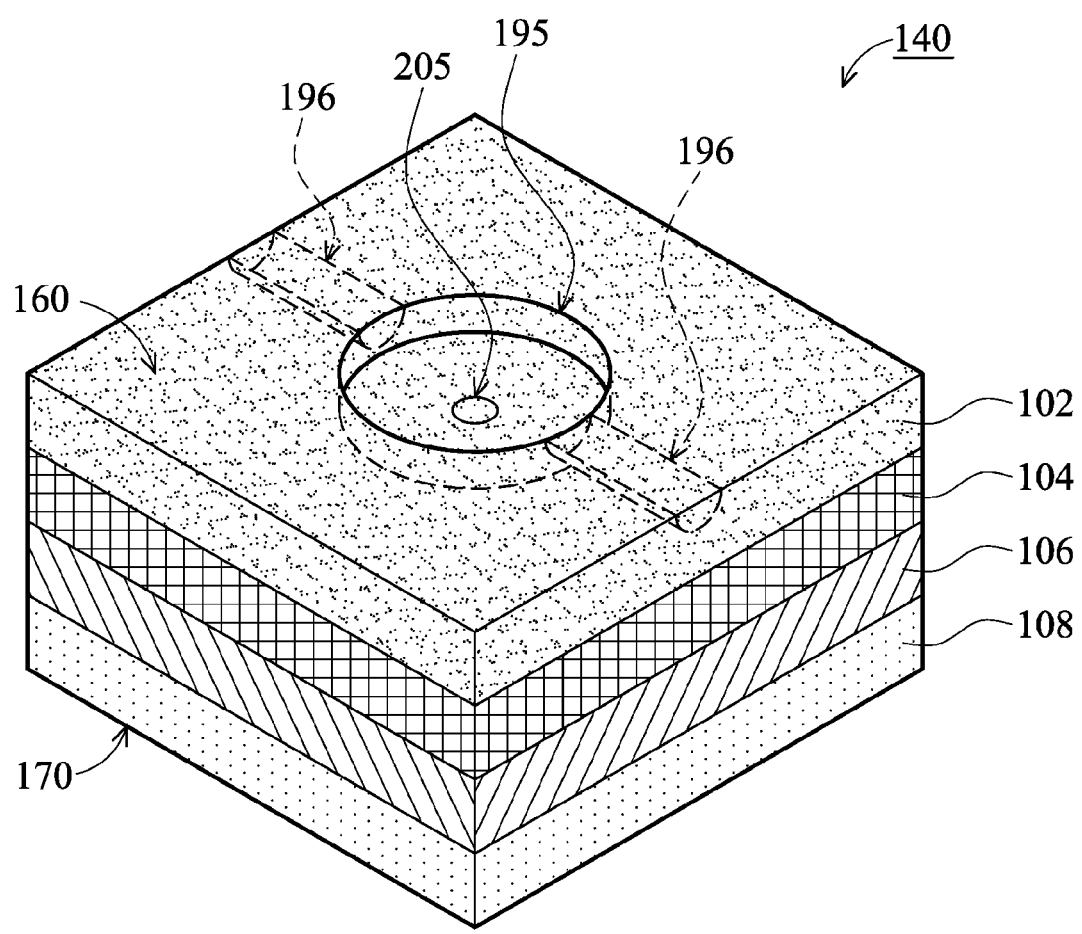

FIG. 4 is another stereo diagram showing the gradient interconnect 140 illustrated in FIG. 2. As shown in FIG. 4, the gradient interconnect 140 is substantially similar with that illustrated in FIG. 3. In FIG. 4, the gradient sub-layers 102, 104, 106 and 108 of the gradient interconnect 140 are turned upside down to show the trench 195 exposed by the surface 160 of the gradient sub-layer 102.

In this embodiment, the trench 195 is illustrated as a circular trench formed in the gradient sub-layer 102 and the trench 195 also reveals the interconnecting tunnel 205 passing through the gradient sub-layers 102, 104, 106, and 108. The trench 185 is embedded within the gradient sub-layer 108 and is not illustrated. In addition, in respect to mass area fabrication of the gradient interconnect, a connecting tunnel 196 (illustrated in dotted line) may be formed in a gradient sub-layer 102 adjacent to the opposite sides of the trench 195.

As shown in FIGS. 2-4, the trenches 185 and 195 in the gradient interconnect 140 are illustrated as circular trenches, but the invention is not limited thereto. The trenches 185 and 195 can be formed in other polygonal configuration such as a rectangle, and the gradient interconnect 140 can be formed in other configurations such as a circular disc or circuit ingot rather than the rectangular solid.

Figure 5:
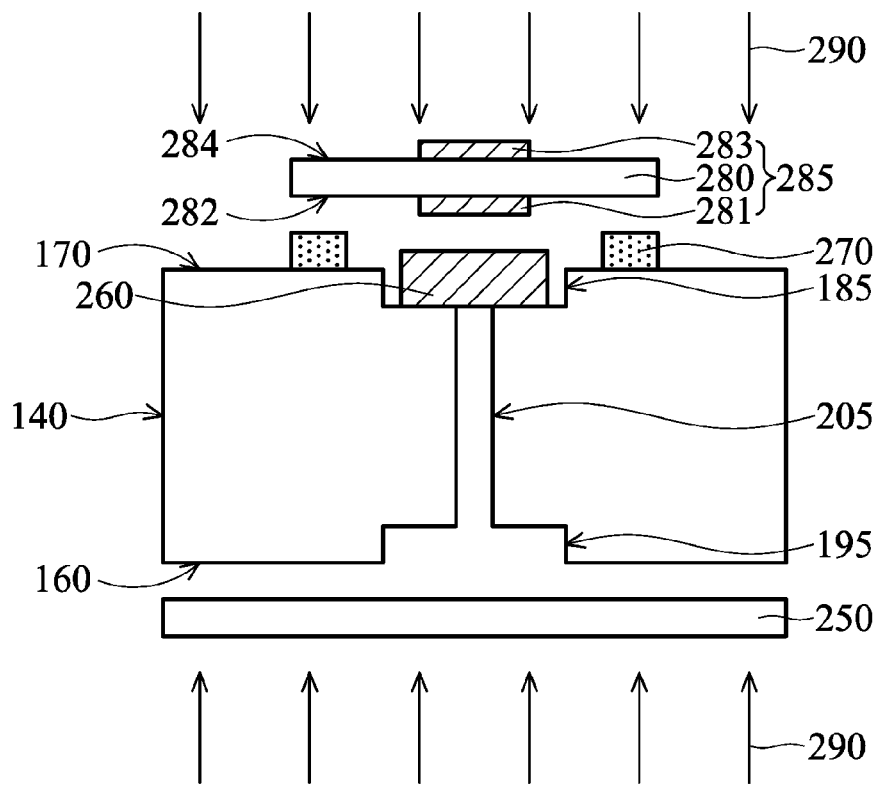
FIGS. 5 and 6 are cross sections showing a method for fabricating a solid oxide fuel cell (SOFC) device according to an embodiment of the invention.
Figure 6:
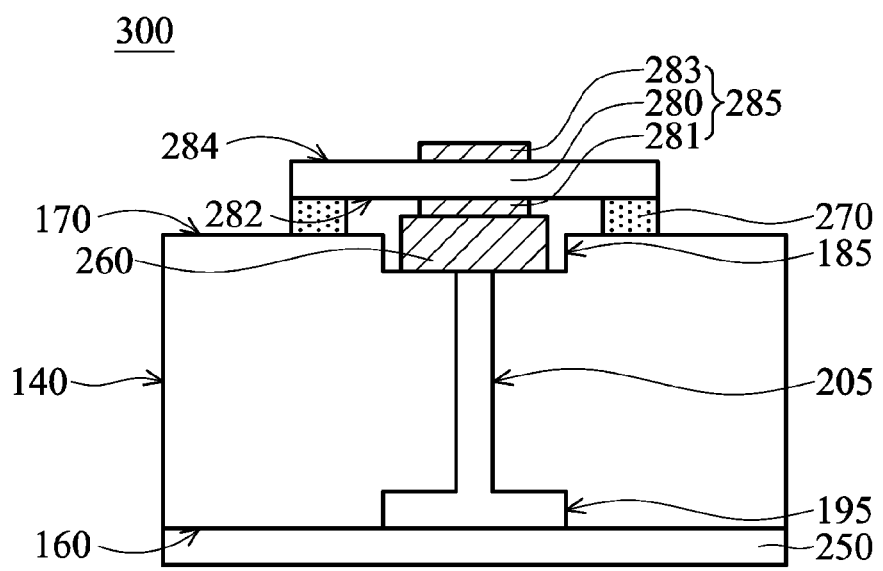

FIGS. 5 and 6 are cross sections showing an exemplary method for fabricating a solid oxide fuel cell (SOFC) device.

In FIG. 5, a gradient interconnect such as the gradient interconnect 140 illustrated in FIG. 2 is first provided. The gradient interconnect 140 is provided with opposite surfaces 170 and 160, and trenches 185, 195 and an interconnecting tunnel 205 are positioned in the gradient interconnect. The interconnecting tunnel 205 connects the trench 185 with the trench 195 to allow transportation of the reaction gases contained in the trench 195 to the trench 185. Next, a sealing layer 270 is formed over the surface 170 of the gradient interconnect 140. Herein, the sealing layer 270 surrounds the trench 185. Next, a porous conducting disc 260 is provided and placed in the trench 185. In this embodiment, the porous conducting disc 260 is an electrically conductive pellet and a portion thereof protrudes over the surface 170 of the gradient interconnect 140. Next, a membrane electrode assembly (MEA) 285 is provided, comprising an electrolyte layer 280 and electrode layers 281 and 283 respectively formed over opposite surfaces 282 and 284 of the electrolyte layer 280. In this embodiment, the surface 282 of the MEA and the electrode layer 281 face the trench 185, the sealing layer 270 and the porous conducting disc 260.

In one embodiment, the electrode layers 281 and 283 formed over the surfaces 282 and 284 may respectively function as a porous cathode layer or a porous anode layer. A porous film made of yttrium stabilized zirconia with nickel or copper may be applied if one of the electrode layers 281 and 283 functions as an anode electrode layer, and a composite porous film made of conductive oxides with electrolyte materials such as $(La,Sr)MnO_3$, $(La,Sr)(Fe, Co)O_3$, $(La,Sr)FeO_3$, $(La,Sr)CoO_3$, or $La(Ni,Fe)O_3$ may be applied if one of the electrode layers 281 and 283 functions as a cathode electrode layer.

Next, a blocking plate 250 is provided and placed adjacent to the surface 160 of the gradient interconnect 140. Next, a compression process 290 is performed under a temperature of about 1050~1250° C. for about 15-60 minutes to junction the MEA 285, the porous conductive disc 260, the sealing layer 170, the gradient interconnect 140 and the blocking plate to thereby form a solid oxide fuel cell (SOFC) device 300, as shown in FIG. 6.

As shown in FIG. 6, an exemplary SOFC device 300 is provided, comprising: a first gradient interconnect (e.g. the gradient interconnect 140) having opposing first surface (e.g. the surface 170) and second surface (e.g. the surface 160), a first trench (e.g. the trench 185) formed over the first surface of the first gradient interconnect, a second trench (e.g. the trench 195) formed over the second surface of the first gradient interconnect, and an interconnecting tunnel (e.g. the interconnecting tunnel 205) formed in the first gradient interconnect for connecting the first and second trenches. A first porous conducting disc (e.g. the porous conducting disc 260) is placed in the first trench and partially protrudes over the first surface of the first gradient interconnect. A first sealing layer (e.g. the sealing layer 270) is positioned over the first surface of the first gradient interconnect and surrounds the first trench. A membrane electrode assembly (MEA) (e.g. the MEA 285) is placed over the first surface of the first gradient interconnect, wherein the MEA comprises an electrolyte layer having opposing first and second surfaces, and a first electrode placed over the first surface of the MEA and contacting with the first porous conducting disc and the first sealing layer.

In the embodiment, the porous conducting disc 260 may function as a cathode side connector or an anode side connector. Suitable material for fabricating the cathode side connector can be conductive oxides such as $(La,Sr)MnO_3$, $(La,Sr)(Fe, Co)O_3$, $(La,Sr)FeO_3$, $(La,Sr)CoO_3$, or $La(Ni,Fe)O_3$ and electrolytes, and suitable material for fabricating the anode side connector can be yttrium stabilized zirconia with nickel or copper.

Fabrication of the porous conducting disc 260 is first to break above materials for forming the electrode into powders and compress these powders to form a pellet and the pellet is then placed in the trench. The roughed powders are not dense during the thermal compression process such that a lot of pores are formed therein to allow reaction gases to flow through and arrive at the electrode for electrochemical reaction. The roughing process is performed by first heating the materials to a temperature of 900~1250° C., and a mechanical crashing method is then performed to form the rough powders thereof which are not easily sintered.

Materials of the electrolyte layer 280 can be, for example, yttrium stabilized zirconia (e.g. 8 wt % $Y_2O_3$—$ZrO_2$, 8Y—$ZrO_2$), cerium oxide doped with rare earth group metal (e.g. $(Ce,Gd)O_2$), strontium and magnesium doped lanthanum gallium oxide (e.g. $(La,Sr)(Ga,Mg)O_3$), Perovskite doped with rare earth metal or ceramic solid oxide electrolyte such as $BaCeO_3$, $SrCeO_3$, $BaZrO_3$, and $SrZrO_3$. The electrolyte layer 280 is formed with a thickness of about 10 μm to hundreds of μm, and has a diameter greater than 50 mm.

Fabrication of the electrolyte layer 280 comprises, first, compressing powders of materials into a thin tablet having a thickness less than 1 mm, and the thin tablet is then sintered under a temperature of about 1500° C. ~1600° C. for 1-6 hours, and then treated by a mechanical process such as a rough grinding, fine grinding, and polishing process. The electrode layer 281 and the electrode layer 283 are then coated over one surface (e.g. the surface 282) and the other surface (e.g. the surface 284) of the electrolyte layer 280 to form a sandwiched structure. A tape casting process can be also performed to form the sandwiched electrolyte layer 280 by combining the electrolyte tape with an electrode layer 281 and another electrode 283 formed by tape-casting methods.

Further, in this embodiment, the sealing layer 270 comprises ceramic materials such as oxides of low melting point of 20 vol % MnO and 20 vol % $Bi_2O_3$, 10 vol % $BaAl_2Si_2O_8$, 15 vol % Ti, and 35 vol % nickel-based supper alloys. In another embodiment, ceramic materials such as nano-aluminum oxide, $BaAl_2Si_2O_8$ doped with $K_2O$, $Na_2O$, or $B_2O_3$, $TiO_2$, or a mixture thereof, can be further provided in the sealing layer 270 of a content of 10~30 vol %, to enhance sintering of the sealing layer 270. Other oxides of low melting point added in the sealing layer 270 can be, for example, ZnO, $SnO_2$, $In_2O_3$, alkali metal oxide, alkaline-earth metal oxide, or a mixture thereof, and the nickel-based super alloys can be, for example, Inco625, Inco600, or Inco601.

In an embodiment, compared with the conventional materials of glass fillers, the $3Y-ZrO_2$ ceramic material of the sealing layer 270 has better toughness and strength, and the low melting point oxide allows subsequent compression processes to be performed under sealing temperature below 1200° C.

In addition, in this embodiment, the blocking plate 250 positioned over the surface 160 of the gradient interconnect 140 is used for sealing the trench 195 and is made of 50~100 vol % nickel-based super alloys, 30~40 vol % iron-based steels, and 0~20 vol % ceramics of SiC, thereby precisely jointing the surface 160 with a metal rich phase of the gradient interconnect 140.

The SOFC device 300 illustrated in FIG. 6 can be provided as a single cell unit located at a cathode end or an anode end of an SOFC device. The MEA 285 coated with the cathode electrode layer and the anode electrode layer, the porous conducting disc, and the blocking plate 250 can be first formed and then provided during assembly of the SOFC device 300. Because components of the SOFC device 300 can be first fabricated, the SOFC devices are provided with advantages of easy assembly which is convenient for mass production thereof.

Figure 7:
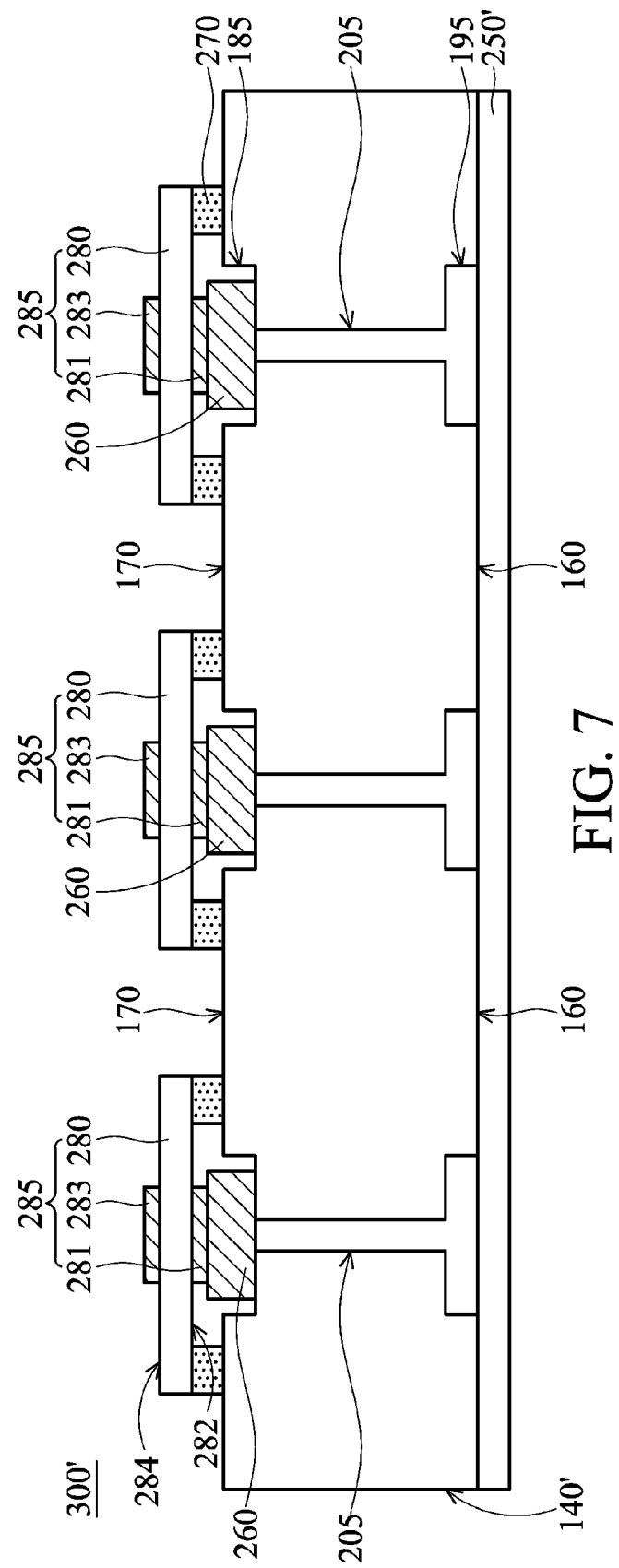
FIG. 7 is a cross section showing a solid oxide fuel cell (SOFC) device according to another embodiment of the invention.

The exemplary method for fabricating the SOFC device disclosed in FIGS. 5-6 merely illustrates fabrication of the SOFC 300 with a small size. However, the method for fabricating the SOFC device is also applicable to fabrication of SOFC devices with larger sizes by enlarging the surface area of the gradient interconnect 140 and the blocking plate 250. Other components such as the MEA 285 and the porous conducting disc 260 can still be fabricated in a relatively small size. FIG. 7 shows a modified SOFC device 300' having a gradient interconnect 140' and a blocking plate 250' formed with a larger surface. The SOFC device 300' comprises three sets of single cell units as shown in FIG. 6.

Figure 8:
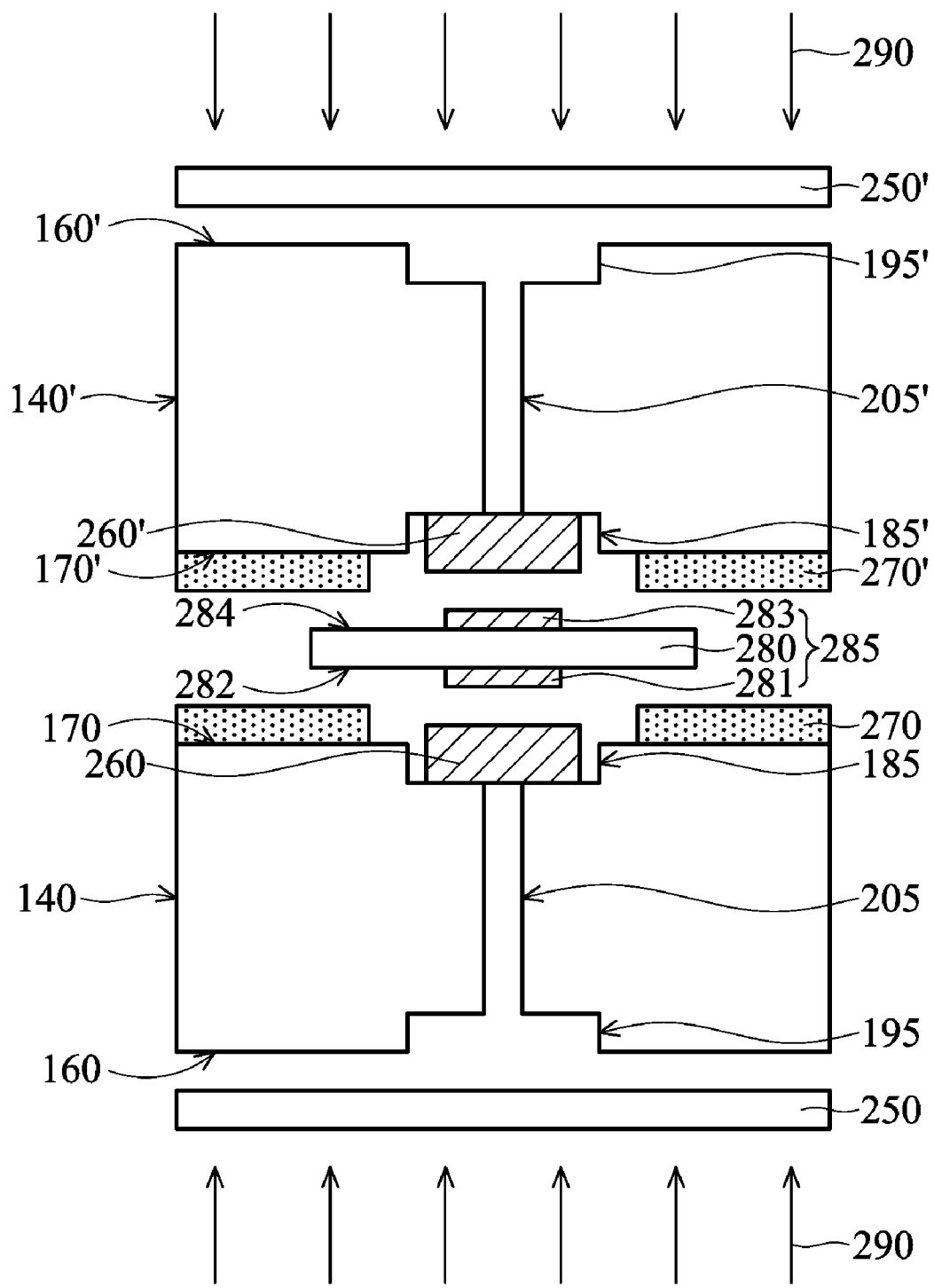
FIGS. 8 and 9 are cross sections showing a method for fabricating a solid oxide fuel cell (SOFC) device according to another embodiment of the invention.
Figure 9:
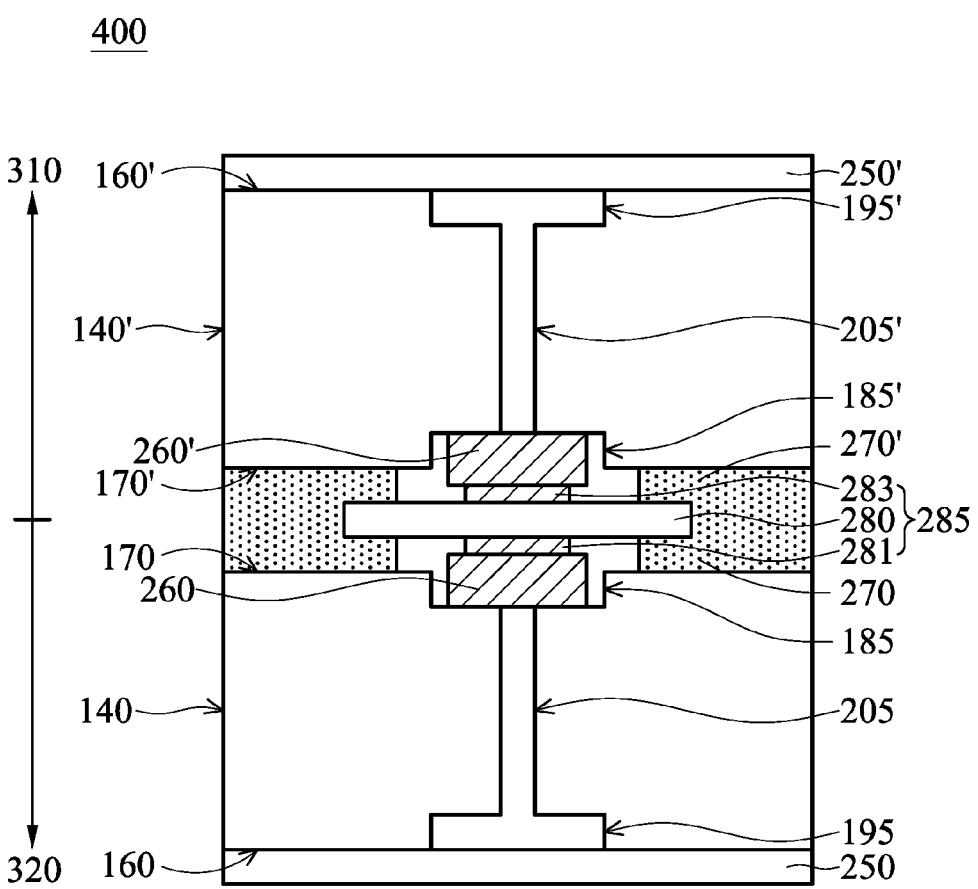

FIGS. 8 and 9 are cross sections showing another exemplary method for fabricating an SOFC device.

In FIG. 8, a gradient interconnect such as the gradient interconnect 140 illustrated in FIG. 2 is provided. The gradient interconnect 140 is provided with opposite surfaces 170 and 160, and trenches 185, 195 and an interconnecting tunnel 205 are disposed therein. The interconnecting tunnel 205 connects the trench 185 with the trench 195 to allow the reaction gases contained in the trench 195 to transport to the trench 185. Next, a sealing layer 270 is formed over the surface 170 of the gradient interconnect 140. Herein, the sealing layer 270 surrounds the trench 185. Next, a porous conducting disc 260 is provided and disposed in the trench 185. In this embodiment, the porous conductive disc 260 is an electrically conductive ingot and a portion thereof protrudes over the surface 170 of the gradient interconnect 140. Next, a membrane electrode assembly (MEA) 285 is provided, comprising an electrolyte layer 280 and electrode layers 281 and 283 respectively formed over opposite surfaces 282 and 284 of the electrolyte layer 280. In this embodiment, the surface 282 of the MEA and the electrode layer 281 face to the trench 185, the sealing layer 270 and the porous conductive disc 260.

Next, another gradient interconnect 140' similar with the gradient interconnect 140 illustrated in FIG. 2 is provided over the surface 282 of the electrolyte layer 280 in the MEA 285. Herein, the gradient interconnect 140' is provided with opposite surfaces 170' and 160', wherein the surface 170' is opposite to the surface 284 of the electrolyte layer 280 in the MEA 285, and trenches 185', 195' and an interconnecting tunnel 205' are disposed therein. The interconnecting tunnel 205' connects the trench 185' with the trench 195' to allow transportation of the reaction gases contained in the trench 195' to the trench 185'. Next, a sealing layer 270' is formed over the surface 170' of the gradient interconnect 140'. Herein, the sealing layer 270' surrounds the trench 185'. Next, a porous conducting disc 260' is provided and disposed in the trench 185'.

In this embodiment, the porous conducting disc 260' is an electrically conductive ingot and a portion thereof protrudes over the surface 170' of the gradient interconnect 140'. Next, a blocking plate 250 and a blocking plate 250' are provided and are respectively disposed adjacent the surface 160 of the gradient interconnect 140 and the surface 160' of the gradient interconnect 140'.

Next, a compression process 290 is performed under a temperature of about 1050~1250° C. for about 15-60 minutes to junction the blocking plate 250', the gradient interconnect 140', the porous conductive disc 260', the sealing layer 170', the MEA 285, the porous conductive disc 260, the sealing layer 170, the gradient interconnect 140 and the blocking plate 250 to thereby form a solid oxide fuel cell (SOFC) device 400, as shown in FIG. 9.

As shown in FIG. 9, the exemplary solid oxide fuel cell device 400 comprises a first gradient interconnect (e.g. the gradient interconnect 140) having opposing first surface (e.g. the surface 170) and second surface (e.g. the surface 160), a first trench (e.g. the trench 185) formed in the first surface of the first gradient interconnect, a second trench (e.g the trench 195) formed over the second surface of the first gradient interconnect, and an interconnecting tunnel (e.g. the interconnecting tunnel 205) formed in the first gradient interconnect for connecting the first and second trenches. A first porous conducting disc (e.g. the porous conducting disc 260) is disposed in the first trench and partially protrudes over the first surface of the first gradient interconnect. A first sealing layer (e.g. the sealing layer 270) is disposed over the first surface of the first gradient interconnect and surrounds the first trench. A membrane electrode assembly (MEA) (e.g. the MEA 285) is disposed over the first surface of the first gradient interconnect, wherein the MEA comprises an electrolyte layer (e.g. the electrolyte layer 280) having opposing first surface (e.g. the surface 282) and second surface (e.g. the surface 284), and a first electrode disposed over the first surface of the MEA and contacting with the first porous conducting disc and the first sealing layer. A second gradient interconnect (e.g. the gradient interconnect 140') is disposed over the second surface of the electrolyte layer, having opposing third surface (e.g. the surface 170') and fourth surface (e.g. the surface 160'), a third trench (e.g. the trench 185') formed over the third surface of the second gradient interconnect, a fourth trench (e.g. the trench 195') formed over the fourth surface of the second gradient interconnect, and an second interconnecting tunnel (e.g. the interconnecting tunnel 205') formed in the second gradient interconnect for connecting the third and fourth trenches. A second porous conducting disc (e.g. the porous conducting disc 260') is disposed in the third trench and partially protrudes over the third surface of the second gradient interconnect. A second sealing layer (e.g. the sealing layer 270') is disposed over the third surface of the second gradient interconnect, surrounding the third trench, wherein the second surface of the electrolyte layer contacts with the second sealing layer and the second electrode contacts with the second porous conductive interconnecting disc.

In this embodiment, materials of the blocking plate 250', the gradient interconnect 140', the porous conducting disc 260', the sealing layer 170' are the same with the blocking plate 250, the gradient interconnect 140, the porous conductive disc 260, and the sealing layer 170 used in the SOFC device 300 illustrated in FIGS. 5-6. Note that the porous conducting discs 260' and 260 respectively function as an anode side connector and a cathode side connector, wherein the porous conducting discs 260' and 260 are formed with different materials.

In this embodiment, the SOFC device 400 illustrated in FIG. 9 can be used as a cell unit and an anode side 310 and a cathode side 320 can be divided from a center of the MEA 285. The MEA 285, the porous conducting disc 260/260', and the blocking plate 250/250' can be first prepared and then provided during assembly of the SOFC device 400. Since components can be first prepared, the SOFC device 400 has advantages of easy fabrication and promotes ease of mass production of SOFC devices.

The exemplary method for fabricating SOFC devices disclosed in FIGS. 8-9 merely illustrates fabrication of the SOFC device 400 with a small size. However, the method for fabricating an SOFC device is also applicable to fabrication of SOFC devices of large sizes by repeatedly disposing the gradient interconnects 140 and 140', the porous conducting discs 260 and 260', and the sealing layer 170 and 170' and the MEA 285.

Figure 10:
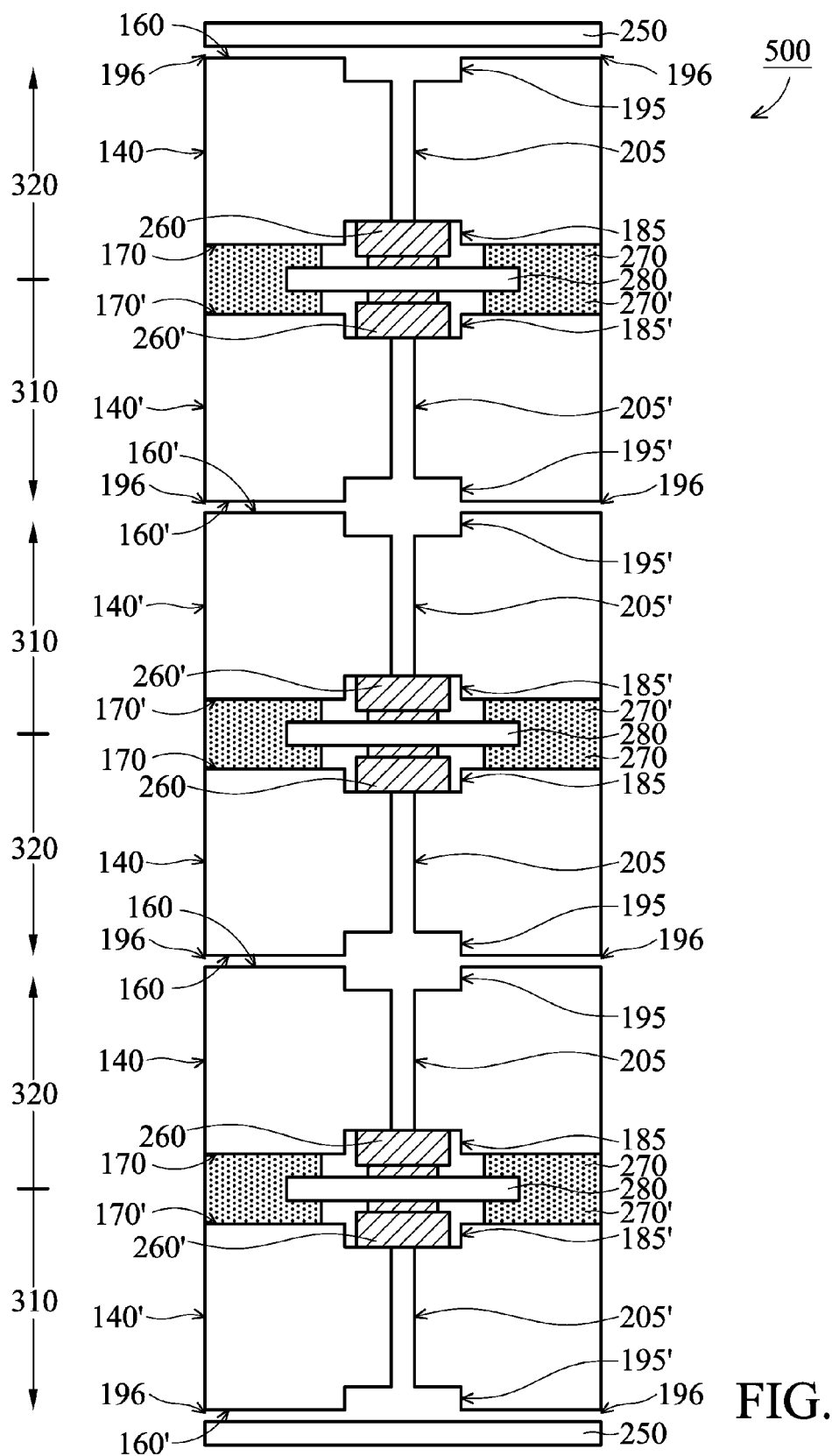
FIG. 10 is a cross section showing a solid oxide fuel cell (SOFC) device according to another embodiment of the invention.
Figure 11:
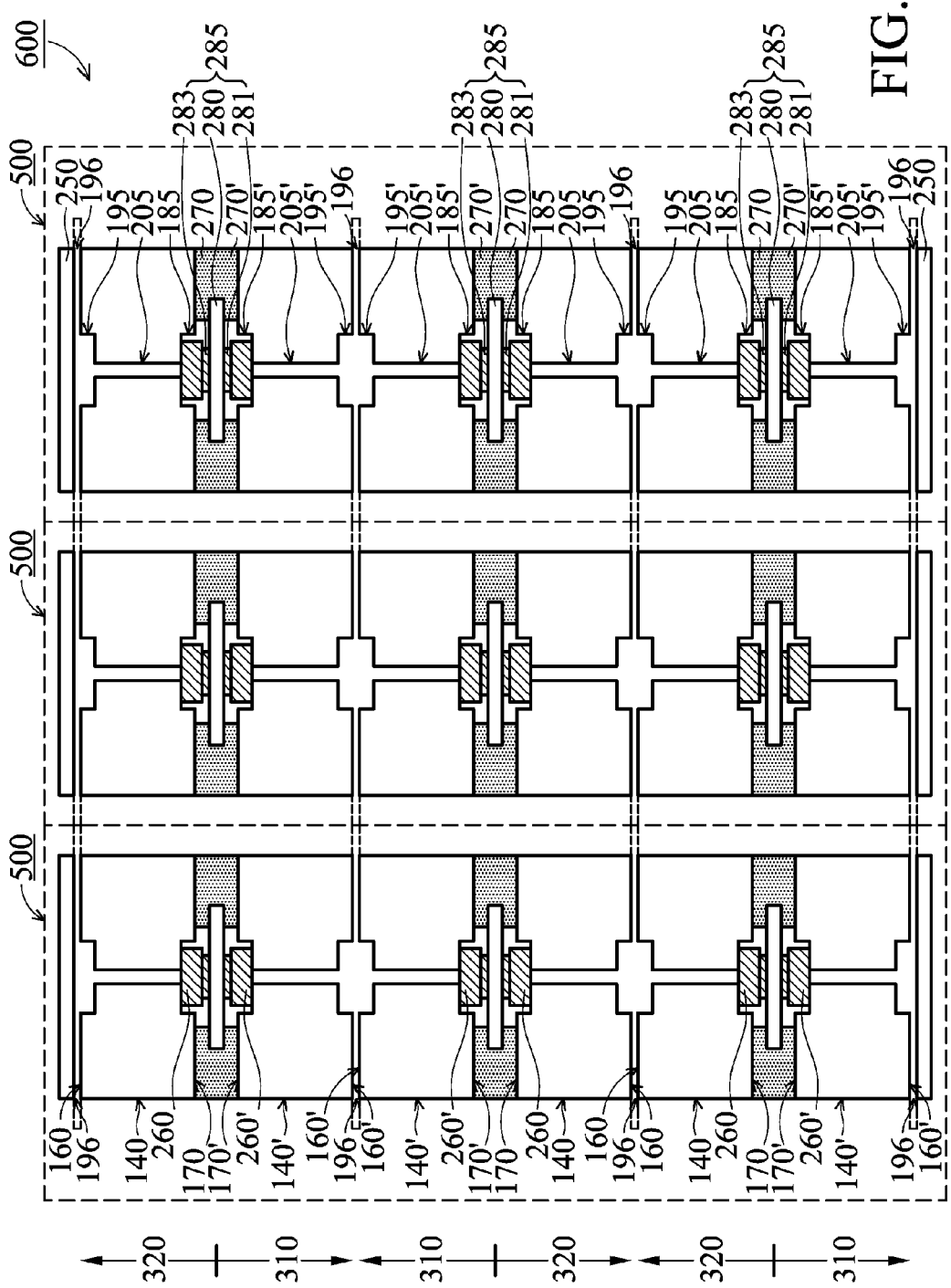
FIG. 11 is a cross section showing a solid oxide fuel cell (SOFC) device according to yet another embodiment of the invention.

As shown in FIG. 10, another exemplary SOFC device 500 is illustrated, having a cell stack structure. Similar components in the SOFC device 500 are illustrated with similar numeral titles shown in FIG. 9. In addition, the connecting tunnel 196 illustrated in FIG. 4 can be formed over a surface 160 of each of the gradient interconnect 160/160' and the connecting tunnel 196 may be then connected to a gas supplying pipe (not shown) by laser welding, thereby forming a cell stack structure. Moreover, as shown in FIG. 11, another exemplary SOFC device 600 formed by laterally combining three sets of the SOFC devices 500 shown in FIG. 10 is illustrated, wherein a plurality of connecting tunnels 196 can be provided between the SOFC devices 500 by laser welding. to thereby connect with a gas supply piping.

The exemplary SOFC devices illustrated in FIGS. 6-7 and 9-11 have the following advantages.

1. The gradient interconnect 140/140' uses nickel-based supper alloys and ceramic materials of various gradient concentrations, and a portion of the gradient interconnect connected with the surface 170/170' of the sealing layer 270/270' is formed of a ceramic-rich composition (i.e. having a ceramic content 50 vol %). Thus ceramic/ceramic junctions are formed between the ceramic sealing materials in the sealing layer 270/270' and the electrolyte layer 280 made of ceramic materials in the MEA 285, thereby preventing the metal/ceramic jointing issues due to different wetting properties between the metal materials of the interconnecting plate and the ceramic materials in the ceramic electrolytes.

2. The gradient interconnect 140/140' uses mainly nickel-based super alloys and oxidation thereof under a high operation temperature of 900° C. is prevented.

3. The gradient interconnect 140/140' uses nickel-based supper alloys, iron-based alloys, and ceramic materials of various gradient concentrations, and a portion of the gradient interconnect connected with the surface 170/170' of the sealing layer 270/270' is formed with a ceramic-rich composition (i.e. having ceramic content not less than 50 vol %), and the other portion of the gradient interconnect connected with the blocking plate 250/250' or the surface 160/160' is formed with a metal-rich composition having a ceramic content of 0~20 vol %.

Therefore, after thermal cycling induced by operations of the fuel cell device, a compressive stress is caused between the ceramic-rich composition of the gradient interconnect which is connected with the surface of the sealing layer 270/270' and the adjacent MEA 285 of ceramic materials, and a tensile stress is caused between the metal-rich composition of the gradient interconnect which is connected with the blocking plate 250/250' or the surface 160/160', thereby preventing cracking or leakages of the ceramic junctions between the MEA 285, the sealing layer 270/270', and the surface 170/170' of the gradient interconnect. The SOFC devices of the invention maintain their structural integrity after 30 thermal cycling tests which were operated between 25-800° C.

4. The ceramic sealing materials used in the sealing layer 270/270' perform improved strength and enhanced fracture toughness. Junction reliability is sustained during high operating temperatures of 800° C. due to the sealing process being at a higher temperature of 1100~1200° C.

5. The porous conducting disc 260/260' and the electrode layers 281 and 283 of the MEA 285 are substantially embedded in the gradient interconnect 140/140'. The porous conductive disc 260/260' provides support to the electrolyte structure and the gradient interconnect 140/140' of metal-rich composition provides mechanical protection to the MEA, thereby ensuring integrity of the fuel cell device during assembly.

6. Components such as the MEA, the gradient interconnect, the porous conducting disc, and the sealing layer in the SOFC device of the invention can be individually fabricated and then assembled to form an SOFC device of large integration and large area

EXAMPLE

Example 1

Fabrication of the Gradient Interconnect A

The gradient interconnect A uses Inco625 as the nickel-base super alloy and nano-aluminum oxide as ceramic materials, and the gradient interconnect A comprises five gradient sub-layers, each having a surface area of 3 cm by 3 cm. Composition for each gradient sub-layer is as follows:

$1^{st}$ gradient sub-layer: 45 vol % Inco625 and 55 vol % $Al_2O_3$;

$2^{nd}$ gradient sub-layer: 55 vol % Inco625 and 45 vol % $Al_2O_3$;

$3^{rd}$ gradient sub-layer: 70 vol % Inco625 and 30 vol % $Al_2O_3$;

$4^{th}$ gradient sub-layer: 85 vol % Inco625 and 15 vol % $Al_2O_3$; and $5^{th}$ gradient sub-layer: 100 vol % Inco625.

Example 2

Fabrication of the Gradient Interconnect B

The gradient interconnect B uses Inco625 as the nickel-base super alloy and nano-aluminum oxide as ceramic materials, and the gradient interconnect B comprises five gradient sub-layers, each having a surface area of 3 cm by 3 cm. Composition for each gradient sub-layer is as follows:

$1^{st}$ gradient sub-layer: 55 vol % $3Y-ZrO_2$, 35 vol % Inco625, and 10 vol % $Al_2O_3$+10 wt % $Bi_2O_3$ (based upon the amount of $3Y-ZrO_2$, Inco625, and $Al_2O_3$);

$2^{nd}$ gradient sub-layer: 20 vol % $3Y-ZrO_2$, 45 vol % Inco625, 26.5 vol % 410SS, and 5 vol % SiC;

$3^{rd}$ gradient sub-layer: 40 vol % $3Y-ZrO_2$, 40 vol % Inco625, 15 vol % 410SS, and 8.5 vol % SiC;

$4^{th}$ gradient sub-layer: 10 vol % $3Y-ZrO_2$, 50 vol % Inco625, 30 vol % 410SS, and 10 vol % SiC;

$5^{th}$ gradient sub-layer: 50 vol % Inco625, 40 vol % 410SS, and 10 vol % SiC.

Since the material property between the $3^{rd}$ gradient sub-layer and the $2^{nd}$ gradient sub-layer in the gradient interconnects A and B change dramatically, and a such non-linear changes cause tensile stresses at a metal-rich end in the gradient interconnects A and B and compressive stresses at a ceramic-rich end in the gradient interconnects A and B formed by thermally compression. Thus, cracking of the ceramic material induced by thermal stress is eliminated. The sub-layers of the gradient interconnects A and B are thermally compressed under an argon atmosphere and a temperature of 1200° C., thereby forming the gradient interconnects A and B.

Example 3

Preparation of the Electrolyte Layer

Powders of $8Y-ZrO_2$ solid oxides (fabricated by Zirconia Sales (America), Inc. (Marietta, Ga., USA)) were provided and compressed by a mold to form a thin disc. The obtained thin disc was sintered in an air environment at a temperature of 1550° C. for three hours. The sintered thin disc was then thinned and burnished by suitable mechanical processes and polishing.

Example 4

Fabrication of the Cathode Electrode

A slurry obtained by mixing $(La,Sr)MnO_3$ of a content of 50-75 wt %, $8Y-ZrO_2$ of a content of 50-25 wt %, and a solution containing polyvinyl alcohol binder was coated over the electrolyte layer and was then sintered at a temperature of 900~1200° C. for two hours to obtain a cathode electrode. To obtain a cathode electrode with high porosity, powders of the $(La,Sr)MnO_3$ were first sintered under a temperature of 900~1250° C. and then processed by a mechanical crushing method, thereby having more rough grains.

Example 5

Fabrication of the Anode Electrode

A slurry obtained by mixing $8Y-ZrO_2$ of a content of 50~30 wt %, NiO of a content of 50-70 wt %, and a solution containing polyvinyl alcohol binder was coated over the electrolyte layer and was then sintered at a temperature of 1200~1400° C. for two hours to obtain an anode electrode. To obtain more high porosity, powders of the $8Y-ZrO_2$ were first sintered under a temperature of 1000~1350° C. and then processed by a mechanical crushing method, thereby having more rough grains.

Example 6

Fabrication of the Sealing Layer

A sealing material of a composition of 35 vol % Inco625, 20 vol % MnO, 15 vol % $BaAl_2Si_2O_8$, 15 vol % Ti, and 20 vol % $Bi_2O_3$ was coated over a surface of the gradient interconnect facing the MEA.

Example 7

Thermal Cycling Tests

A heavy weight was provided over a stacked structure comprising an electrolyte layer coated with electrode layers, a sealing layer, and a gradient interconnect, and a compression process was performed at a temperature of 1200° C. for 30 minutes to thereby form a single cell unit. Examinations were performed to the interfaces between the components of the single cell unit by an optical microscope and an electrical microscope and no cracking was found at the interfaces. The sealing layer tightly sealed the electrolyte layer with the gradient interconnect.

Next, a thermal fatigue test was performed to the stacked structure at a temperature between 25~800° C. for thirty times. In the thermal fatigue test, the stacked structure was gradually subjected to a high temperature furnace of a high temperature in five stages. Each stage lasted for one minute, except for the last stage, wherein the fifth stage lasted for ten minutes. Thereafter, the stacked structure was gradually removed from the high temperature furnace in five stages and each stage lasted for one minute. Following thirty consecutive thermal fatigue tests performed by the high temperature furnace, the structural integrity of the stacked structure remained. Since the components in the stacked structure were able to endure thermal stresses suffereing during fabrication process at 1250° C.), cracking at interfaces and leaking gas did not occur for a thermal cycling test performed under 800° C.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A solid oxide fuel cell (SOFC) device having gradient interconnects, comprising:
   a first gradient interconnect having opposing first and second surfaces, a first trench formed over the first surface the first gradient interconnect, a second trench formed over the second surface of the first gradient interconnect, and an interconnecting tunnel formed in the first gradient interconnect for connecting the first and second trenches;
   a first porous conducting disc positioned in the first trench, partially protruding over the first surface of the first gradient interconnect;
   a first sealing layer placed over the first surface of the first gradient interconnect, surrounding the first trench; and
   a membrane electrode assembly (MEA) positioned over the first surface of the first gradient interconnect, wherein the MEA comprises an electrolyte layer having opposing first and second surfaces, a first electrode placed over the first surface, and a second electrode placed over the second surface, and the first surface of the electrolyte layer contacts with the first sealing layer and the first electrode contacts with the first porous conducting disc.

2. The SOFC device as claimed in claim 1, wherein the first gradient interconnect comprises metallic materials of nickel-based super alloys and iron-based steels and ceramic materials, and a content of the metallic materials in the first gradient interconnect is reduced from the second surface of the first gradient interconnect to the first surface of the first gradient interconnect.

3. The SOFC device as claimed in claim 2, wherein a content of the ceramic materials in the first gradient interconnect is reduced from the first surface of the first gradient interconnect to the second surface of the first gradient interconnect.

4. The SOFC device as claimed in claim 2, wherein a content of the nickel-based super alloys adjacent to the second surface of the first gradient interconnect is 50%~100 vol %, a content of the iron-based steels adjacent to the second surface of the first gradient interconnect is 30%~40 vol % and a content of the ceramic materials adjacent to the second surface of the first gradient interconnect is 0~20 vol %.

5. The SOFC device as claimed in claim 2, wherein a content of the nickel-based super alloys adjacent to the first surface of the first gradient interconnect is not greater than 50 vol % and a content of the ceramic materials adjacent to the first surface of the first gradient interconnect is not less than 50 vol %.

6. The SOFC device as claimed in claim 2, wherein the nickel-based super alloys comprise Inco625, Inco600 or Inco601, the iron-based steels comprise pure iron, 304SS, 410SS, and 430SS, and the first sealing layer comprises ceramic materials of a content not less than 50 vol %, in which oxides with low melting point have a content not less than 15 vol %, metallic Ti, and nickel-based supper alloys.

7. The SOFC device as claimed in claim 1, wherein the cathode electrode comprises $(La,Sr)MnO_3$, $(La,Sr)(Fe,Co)O_3$, $(La,Sr)FeO_3$, $(La,Sr)CoO_3$ or $La(Ni,Fe)O_3$, and the anode electrode comprises $8Y$—$ZrO_2$ and nickel or copper.

8. The SOFC device as claimed in claim 1, wherein the electrolyte layer comprises yttrium stabilized zirconia, cerium oxide doped with rare earth metal, strontium and magnesium doped lanthanum gallium oxide, or Perovskite doped with rare earth metal.

9. The SOFC device as claimed in claim 4, further comprising a first blocking plate disposed over the second surface of the first gradient interconnect for sealing the second trench, wherein the first blocking plate comprises nickel-based super alloys of a content of 50~100 vol %, iron-based steels of a content of 30~40 vol %, and ceramics SiC of a content of 0~20 vol %.

10. The SOFC device as claimed in claim 1, wherein the second trench is used for containing oxygen or hydrogen.

11. The SOFC device as claimed in claim 1, further comprising:
    a second gradient interconnect positioned over the second surface of the electrolyte layer, having opposing third and fourth surfaces, a third trench formed over the third surface of the second gradient interconnect, a fourth trench formed over the fourth surface the second gradient interconnect, and an second interconnecting tunnel formed in the second gradient interconnect for connecting the third and fourth trenches;
    a second porous conducting disc placed in the third trench, partially protruding over the third surface of the second gradient interconnect; and
    a second sealing layer disposed over the third surface of the second gradient interconnect, surrounding the third trench, wherein the second surface of the electrolyte layer contacts with the second sealing layer and the second electrode contacts with the second porous conductive interconnecting disc.

12. The SOFC device as claimed in claim 11, wherein the second gradient interconnect comprises metallic materials of nickel-based super alloys and iron-based steels and ceramic materials, and a content of the metallic materials in the second gradient interconnect is reduced from the fourth surface of the second gradient interconnect to the third surface of the second gradient interconnect.

13. The SOFC device as claimed in claim 12, wherein a content of the ceramic materials in the second gradient interconnect is reduced from the third surface of the second gradient interconnect to the fourth surface of the second gradient interconnect.

14. The SOFC device as claimed in claim 12, wherein a content of the nickel-based super alloys adjacent to the fourth surface of the second gradient interconnect is 50%~100 vol %, a content of the iron-based steels adjacent to the second surface of the first gradient interconnect is 30%~40 vol % and a content of the ceramic materials adjacent to the third surface of the second gradient interconnect is 0~20 vol %.

15. The SOFC device as claimed in claim 12, wherein a content of the nickel-based super alloys adjacent to the third surface of the second gradient interconnect is not greater than 50 vol % and a content of the ceramic materials adjacent to the fourth surface of the second gradient interconnect is not less than 50 vol %.

16. The SOFC device as claimed in claim 12, wherein the nickel-based super alloys comprise Inco 625, Inco 600 or Inco 601, the iron-based steels comprise pure iron, 304SS, 410SS, and 430SS, and the second sealing layer comprises ceramic materials of a content not less than 50 vol %, in which oxides with low melting point have a content not less than 15 vol %, metallic Ti, and nickel-based supper alloys.

17. The SOFC device as claimed in claim 11, wherein the first electrode is the cathode electrode, comprising $(La,Sr)MnO_3$, $(La,Sr)(Fe,Co)O_3$, $(La,Sr)FeO_3$, $(La,Sr)CoO_3$ or $La(Ni,Fe)O_3$, and the second electrode is the anode electrode, comprising $8Y$—$ZrO_2$ and nickel or copper.

18. The SOFC device as claimed in claim 11, further comprising a second blocking plate disposed over the fourth surface of the second gradient interconnect for sealing the fourth trench, wherein the second blocking plate comprises nickel-based super alloys of a content of 50~100 vol %, iron-based steels of a content of 30~40 vol %, and ceramics SiC of a content of 0~20 vol %.

19. The SOFC device as claimed in claim 1, wherein the SOFC device is fabricated by the steps comprising:
  providing the first gradient interconnect;
  forming the first sealing layer over the first surface of the first gradient interconnect, surrounding the first trench;
  providing and disposing the first porous conducting disc in the first trench, wherein the first porous conducting disc partially protrudes over the first surface of the first gradient interconnect;
  providing and disposing the membrane electrode assembly (MEA) over the first surface of the first gradient interconnect;
  providing and disposing a first blocking plate over the second surface of first gradient interconnect; and
  performing a compression process under an atmosphere of inert gas and at a temperature of about 1050~1250° C. for jointing the MEA, the first porous conducting disc, the first gradient interconnect, and the first blocking plate.

20. The SOFC device as claimed in claim 11, wherein the SOFC device is fabricated by the steps comprising:
  providing the first gradient interconnect;
  forming the first sealing layer over the first surface of the first gradient interconnect, surrounding the first trench;
  providing and disposing the first porous conducting disc in the first trench, wherein the first porous conducting disc partially protrudes over the first surface of the first gradient interconnect;
  providing and disposing the membrane electrode assembly (MEA) over the first surface of the first gradient interconnect;
  providing the second gradient interconnect;
  forming the second sealing layer over the third surface of the second gradient interconnect, surrounding the third trench;
  providing and disposing the second porous conducting disc in the third trench, wherein the second porous conducting disc partially protrudes over the third surface of the second gradient interconnect and contacts with the second electrode of the MEA;
  providing and disposing the first and second blocking plates over the second surface of first gradient interconnect and the fourth surface of the second gradient interconnect, respectively; and
  performing a compression process under an atmosphere of inert gas and at a temperature of about 1050~1250° C. for jointing the second blocking plate, the second gradient interconnect, the second porous conducting disc, the MEA, the first porous conducting disc, the first gradient interconnect, and the first blocking plate.

* * * * *